United States Patent
Kawakatsu

(10) Patent No.: US 10,411,607 B2
(45) Date of Patent: Sep. 10, 2019

(54) POWER SUPPLY DEVICE HAVING SWITCHING ELEMENT WITH DRIVING FREQUENCY CONTROL BASED ON INPUT VOLTAGE AND IMAGE FORMING APPARATUS HAVING POWER SUPPLY DEVICE

(71) Applicant: CANON KABUSHIKI KAISHA, Tokyo (JP)

(72) Inventor: Jun Kawakatsu, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/716,288

(22) Filed: Sep. 26, 2017

(65) Prior Publication Data

US 2018/0097448 A1 Apr. 5, 2018

(30) Foreign Application Priority Data

Sep. 30, 2016 (JP) .................. 2016-192725

(51) Int. Cl.
*H02M 3/335* (2006.01)
*H02M 3/337* (2006.01)
(Continued)

(52) U.S. Cl.
CPC ..... *H02M 3/33546* (2013.01); *H02M 3/3376* (2013.01); *G03G 15/80* (2013.01);
(Continued)

(58) Field of Classification Search
CPC .............. H02M 3/335–42; H02M 1/32; G03G 15/5004; G03G 15/80
(Continued)

(56) References Cited

U.S. PATENT DOCUMENTS

2005/0212490 A1* 9/2005 Horii ............... H02J 7/0047
320/135
2013/0028000 A1* 1/2013 Mueller ............... H02J 1/102
363/132

(Continued)

FOREIGN PATENT DOCUMENTS

JP 2000-333447 A 11/2000
JP 2006-050688 A 2/2006
(Continued)

*Primary Examiner* — Gary L Laxton
*Assistant Examiner* — Peter M Novak
(74) *Attorney, Agent, or Firm* — Canon U.S.A., Inc. I.P. Division

(57) ABSTRACT

A power supply device controls a driving frequency of a transformer in which a primary side and a secondary side are insulated, thereby converting a voltage input to the primary side, and supplying a voltage output to the secondary side to a load. The power supply device includes a control unit, a switching element, and a setting unit. The control unit is configured to control operation of the switching element for driving the primary side of the transformer. The setting unit is configured to set an upper limit driving frequency of a driving frequency of the switching element. In a case where a voltage to be input to the primary side is higher than a rated input voltage, the control unit controls the operation of the switching element to perform driving by using the upper limit driving frequency as the driving frequency of the switching element.

9 Claims, 11 Drawing Sheets

(51) Int. Cl.
  *G03G 15/00* (2006.01)
  *H02M 1/32* (2007.01)
  *H02M 1/36* (2007.01)
  *H02M 1/00* (2006.01)

(52) U.S. Cl.
  CPC ............... *H02M 1/32* (2013.01); *H02M 1/36* (2013.01); *H02M 2001/0006* (2013.01); *H02M 2001/0058* (2013.01); *Y02B 70/1491* (2013.01)

(58) Field of Classification Search
  USPC .......................................................... 399/88
  See application file for complete search history.

(56) References Cited

U.S. PATENT DOCUMENTS

2017/0063243 A1* 3/2017 Gong ................ H02M 3/33523
2018/0091060 A1* 3/2018 Huang ............... H02M 3/33523

FOREIGN PATENT DOCUMENTS

JP  2009-273324 A  11/2009
JP  2010-204427 A   9/2010

* cited by examiner

POWER SUPPLY DEVICE HAVING SWITCHING ELEMENT WITH DRIVING FREQUENCY CONTROL BASED ON INPUT VOLTAGE AND IMAGE FORMING APPARATUS HAVING POWER SUPPLY DEVICE

BACKGROUND OF THE INVENTION

Field of the Invention

One disclosed aspect of the embodiments relates to a power supply device for supplying power to an electronic apparatus, and particularly relates to a power supply device including a converter for changing output power by controlling a driving frequency.

Description of the Related Art

There has been discussed a power supply device including a converter that changes power by variably controlling a driving frequency on a primary side of an electromagnetic transformer. Such a power supply device has a voltage detection circuit on a side for inputting an alternating voltage to a device, and this voltage detection circuit detects an abnormality of the alternating voltage to be input (see Japanese Patent Application Laid-Open No. 2010-204427).

The voltage detection circuit discussed in Japanese Patent Application Laid-Open No. 2010-204427 has such a configuration that an exclusive detection circuit is provided on a side for inputting an alternating voltage. In this configuration, it is difficult to further reduce the size and cost of the power supply device. Meanwhile, when electronic apparatuses are provided in various countries, power supply circumstances vary from country to country, and stable supply of an alternating voltage is not allowed in some environments.

SUMMARY OF THE INVENTION

According to an aspect of the embodiments, a power supply device controls a driving frequency of a transformer in which a primary side and a secondary side are insulated, thereby converting a voltage input to the primary side, and supplying a voltage output to the secondary side to a load. The power supply device includes a switching element, a control unit, and a setting unit. The switching element is configured to drive the primary side of the transformer. The control unit is configured to control operation of the switching element. The setting unit is configured to set an upper limit driving frequency of a driving frequency of the switching element. In a case where a voltage to be input to the primary side is higher than a rated input voltage, the control unit controls the operation of the switching element to perform driving by using the upper limit driving frequency as the driving frequency of the switching element.

According to another aspect of the embodiments, an image forming apparatus includes an image forming unit configured to form an image on a recording material, and a power supply device configured to control a driving frequency of a transformer in which a primary side and a secondary side are insulated, thereby converting a voltage input to the primary side, and supplying a voltage output to the secondary side to the image forming unit. The power supply device includes a switching element, a control unit, and a setting unit. The switching element is configured to drive the primary side of the transformer. The control unit is configured to control operation of the switching element. The setting unit is configured to set an upper limit driving frequency of a driving frequency of the switching element. In a case where a voltage to be input to the primary side is higher than a rated input voltage, the control unit controls the operation of the switching element to perform driving by using the upper limit driving frequency as the driving frequency of the switching element.

Further features of the disclosure will become apparent from the following description of exemplary embodiments with reference to the attached drawings.

DESCRIPTION OF THE EMBODIMENTS

[Image Forming Apparatus]

Figure 1:
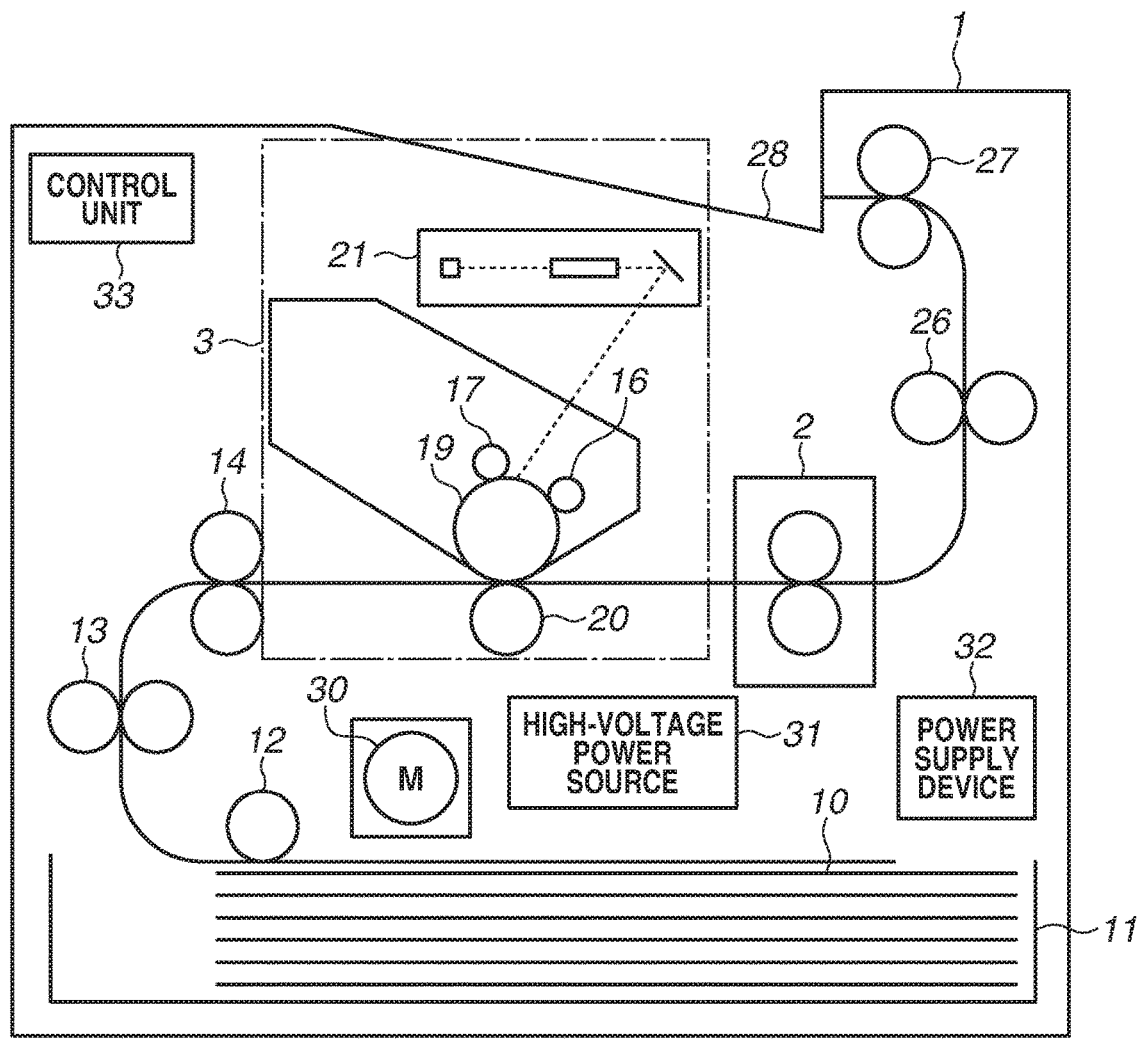
FIG. 1 is a diagram illustrating an overall configuration of an image forming apparatus according to each of a first exemplary embodiment and a second exemplary embodiment.

FIG. 1 is a schematic diagram of a printer 1, which is an image forming apparatus according to a first exemplary embodiment. In the printer 1, upon generation of a print signal, a scanner unit 21 emits a laser beam modulated according to image information, and scans a photosensitive drum 19 with the laser beam. The scanner unit 21 is included in an image forming unit 3 indicated with a dot-and-dash line. The photosensitive drum 19 is charged by a charging roller 16 to have a predetermined polarity. An electrostatic latent image is thereby formed on the photosensitive drum 19. A development device 17 supplies toner to the electrostatic latent image formed on the photosensitive drum 19, so that a toner image corresponding to the image information is formed on the photosensitive drum 19. Meanwhile, sheets 10 stacked in a sheet supplying cassette 11 are fed in such a manner that the sheets 10 are picked up one by one by a pickup roller 12 and then conveyed by a conveyance roller 13 to a registration roller 14. The sheets 10 are recording materials, and the sheet supplying cassette 11 is a paper feeding unit. The sheets 10 are each further conveyed to a transfer nip by the registration roller 14, in timing for arrival of the toner image on the photosensitive drum 19 at the transfer nip. The transfer nip is formed by the photosensitive drum 19 and a transfer roller 20. While the sheet 10 passes through the transfer nip, the toner image on the photosensitive drum 19 is transferred to the sheet 10. The sheet 10 is then heated by a fixing device 2, so that the toner image is fixed onto the sheet 10. The sheet 10, onto which the toner image is fixed, is discharged by discharge rollers 26 and 27, to a sheet discharge tray 28 provided at an upper part of the printer 1. The rollers 26 and 27 form a sheet discharge part. A motor 30 drives the photosensitive drum 19 and the fixing device 2. A high-voltage power source 31 applies a high voltage to the charging roller 16, the development device 17, and the transfer roller 20. A power supply device 32 supplies power to an electric circuit of each of components including the motor 30, the high-voltage power source 31, and the scanner unit 21. A control unit 33 controls various kinds of operation of the printer 1.

[Power Supply Device]

Figure 2:
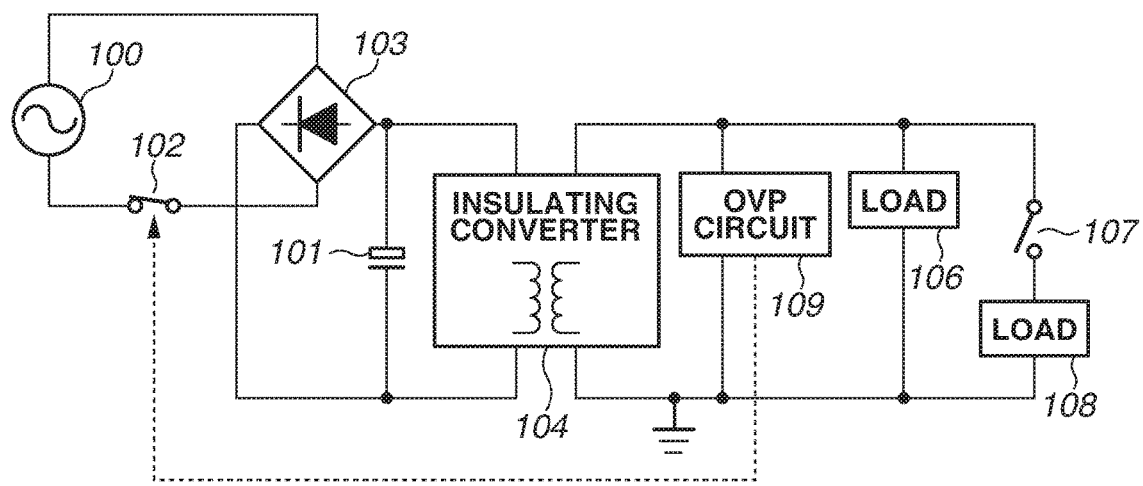
FIG. 2 is a diagram illustrating an overall configuration of a power supply device according to the first exemplary embodiment.

FIG. 2 is a schematic diagram of the power supply device 32. An alternating voltage supplied from a commercial power source 100 is rectified via a rectifier 103, and then input to a primary smoothing capacitor 101. An insulating converter 104 is connected to the primary smoothing capacitor 101. The insulating converter 104 controls a driving frequency for switching operation, thereby changing power (a voltage) to be output from a secondary side. A load 106, a load 108, and an over voltage protection (OVP) circuit 109 are connected to the secondary side of the insulating converter 104. The OVP circuit 109 is a monitoring circuit serving as an output voltage monitoring unit. The OVP circuit 109 is provided to protect a circuit in a case where an output voltage on a secondary side of a transformer is abnormally high. A switch 107 is connected between the insulating converter 104 and the load 108, as a circuit for limiting supply of a voltage from the insulating converter 104 to a load. The load 106 is a first load connected to the insulating converter 104 when the insulating converter 104 is activated. The load 108 is a second load to be connected to or disconnected from the insulating converter 104, accompanying closing or opening of the switch 107, according to an instruction of the control unit 33. Described is a configuration including one disconnectable load. However, a configuration including a plurality of such loads may be adopted. In that case, a switch may be provided between each of the loads and the insulating converter 104, and controlled to be on/off. A switch 102 is connected between the commercial power source 100 and the rectifier 103, as a circuit for stopping the insulating converter 104. The switch 102 is connected to the OVP circuit 109, and turned on/off according to an output signal of the OVP circuit 109.

[Insulating Converter and OVP]

Figure 3:
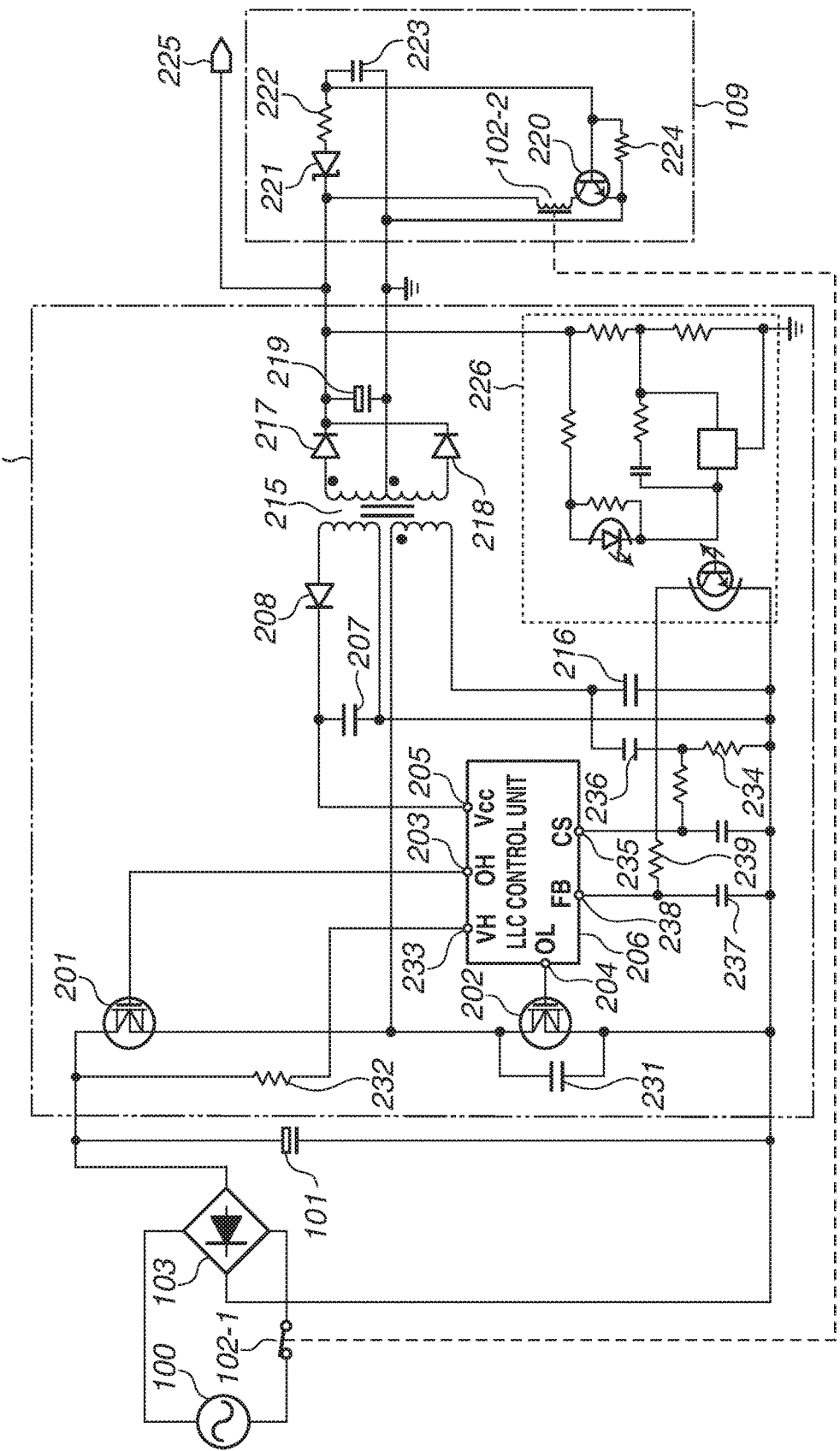
FIG. 3 is a diagram illustrating details of a converter according to the first exemplary embodiment.

FIG. 3 is a diagram illustrating details of the insulating converter 104 and the OVP circuit 109, which is a circuit for monitoring an output voltage. The insulating converter 104 is an LLC converter (a DC/DC converter employing an LLC method) that changes an output voltage (power) by controlling a driving frequency of a transformer 215. An electric current is supplied to a VH terminal 233 of an LLC control unit 206 via a starting resistor 232, and charged into a capacitor 207 via a Vcc terminal 205. The LLC control unit 206 thereby obtains power for activating the insulating converter 104. The insulating converter 104 has the transformer 215 for insulating a primary side and the secondary side. The insulating converter 104 further has two switches 201 and 202 each serving as a switching element. The LLC control unit 206 controls the switch 201, by outputting a switching signal 203 on a high side, from an OH terminal to the switch 201. The LLC control unit 206 controls the switch 202, by outputting a switching signal 204 on a low side, from an OL terminal to the switch 202. The LLC control unit 206 controls switching operation (driving frequency) of the switches 201 and 202. The LLC control unit 206 thereby supplies or interrupts power to the primary side of the transformer 215, and thereby inducing a voltage in an auxiliary winding on the primary side and a secondary winding on the secondary side of the transformer 215. An electric current flowing through the auxiliary winding is rectified by a diode 208 serving as a rectification element, and then charged into the capacitor 207. The LLC control unit 206 can thereby obtain a continuous power supply voltage for operation of the insulating converter 104.

When an electric current flows in a direction from the transformer 215 to a capacitor 216, an electric current flowing through the secondary side flows through a capacitor 219 via a diode 217 serving as a rectification element and is thereby smoothed. In contrast, when an electric current flows in a direction from the capacitor 216 to the transformer 215, an electric current flows through the capacitor 219 via a diode 218 serving as a rectification element and is thereby smoothed. An output of the insulating converter 104 is output to the OVP circuit 109, and output to the load 106 and the load 108 via an output terminal 225.

A feedback circuit 226 transmits an output voltage to an FB terminal 238 of the LLC control unit 206, as a regulation signal. A resistor 239 and a capacitor 237 are each a circuit for setting an upper limit driving frequency of the transformer 215. The LLC control unit 206 controls a switching frequency of the switches 201 and 202, i.e., the driving frequency of the transformer 215, in such a manner that the level of the regulation signal is constant at a frequency equal to or less than the set upper limit driving frequency. The feedback circuit 226 is an ordinary circuit for feeding back a voltage and therefore will not be described in detail.

A CS terminal 235 is a terminal for overcurrent detection. A driving current of the transformer 215 is diverted by a capacitor 236, and then converted into a voltage by a resistor 234. This voltage is then applied to the CS terminal 235. The LLC control unit 206 compares the voltage of the CS terminal 235 and a threshold set inside, and thereby determines whether the insulating converter 104 is in an overcurrent state. Assume that the LLC control unit 206 determines that the insulating converter 104 is in an overcurrent state, based on the voltage of the CS terminal 235, or the LLC control unit 206 determines that the switches 201 and 202 cannot be accurately controlled because the voltage of the Vcc terminal 205 is low. In either case, the LLC control unit 206 stops driving the transformer 215. The LLC control unit 206 is not configured to stop driving the transformer 215 based on the voltage of the FB terminal 238.

Assume that the OVP circuit 109 receives input of a voltage higher than a threshold voltage set by a Zener diode 221, which is a constant voltage element, as well as resistors 222 and 224. At this moment, the OVP circuit 109 turns on a transistor 220 serving as a switch so as to excite a relay coil, and turns off a relay switch 102_2 serving as a switch. As a result, an input to the power supply device is interrupted, and the operation of the insulating converter 104 stops. If the input to the OVP circuit 109 is equal to or lower than the threshold voltage, the OVP circuit 109 turns off the transistor 220 serving as a switch, a switch 102_2 is not turned off, and the operation of the insulating converter 104 continues.

In general, an output gain G of an LLC converter is expressed by the following Equation (1), Equation (2), Equation (3), and Equation (4).

$$G = \frac{1}{\sqrt{\left(S - \frac{S}{F^2} + 1\right)^2 + \frac{1}{Q^2} \cdot \left(F - \frac{1}{F}\right)^2}} \quad (1)$$

$$S = \frac{Ls}{Lp} \quad (2)$$

$$F = \frac{f}{f0} \quad (3)$$

Output voltage=G×turn ratio×input voltage (4)

In the above equations, Ls is a leakage inductance, Lp is a mutual inductance, and f0 is a resonance frequency. Further, Q is a function in which a load is defined as a variable. In other words, the output gain G is a function in which a load and a driving frequency are variables.

Figure 5:
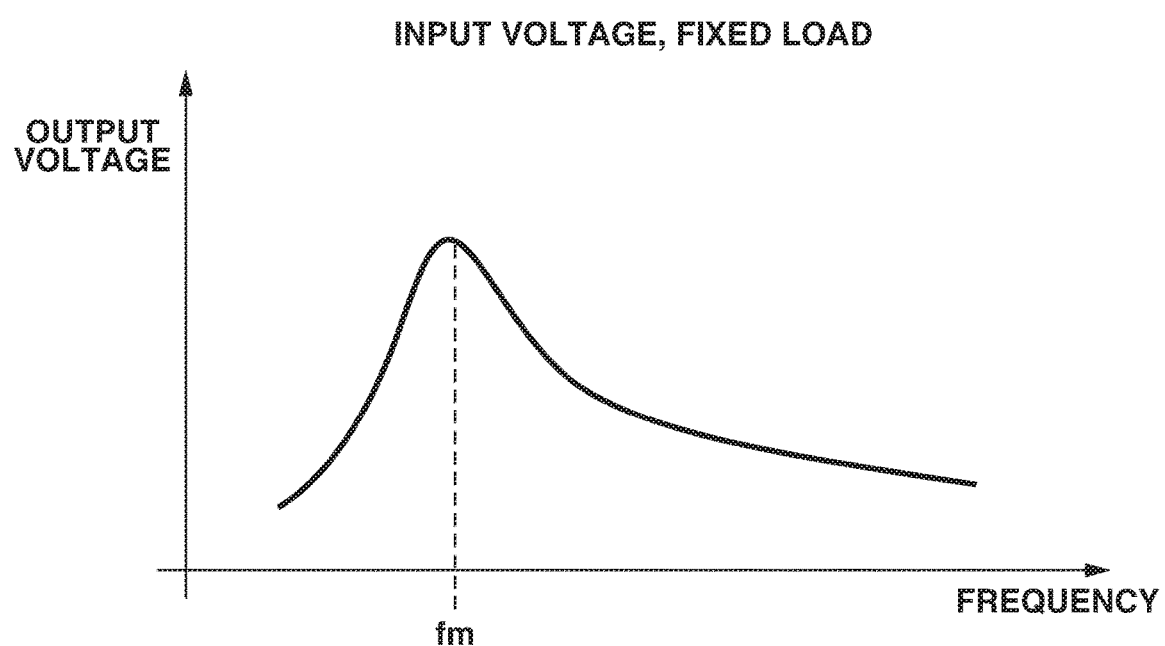
FIG. 5 is a diagram illustrating a relationship between an output voltage and a driving frequency of each of the converter according to the first exemplary embodiment and a converter according to the second exemplary embodiment.

Assume that the input voltage to the power supply device 32 and the load of the insulating converter 104 are both fixed. In this case, a relationship between the output voltage of the insulating converter 104 and the driving frequency of the transformer 215 is expressed as illustrated in FIG. 5. A frequency higher than a frequency fm is used in the insulating converter 104 and therefore, as illustrated in FIG. 5, the driving frequency is increased in a case where the output voltage is to be decreased.

Figure 6:
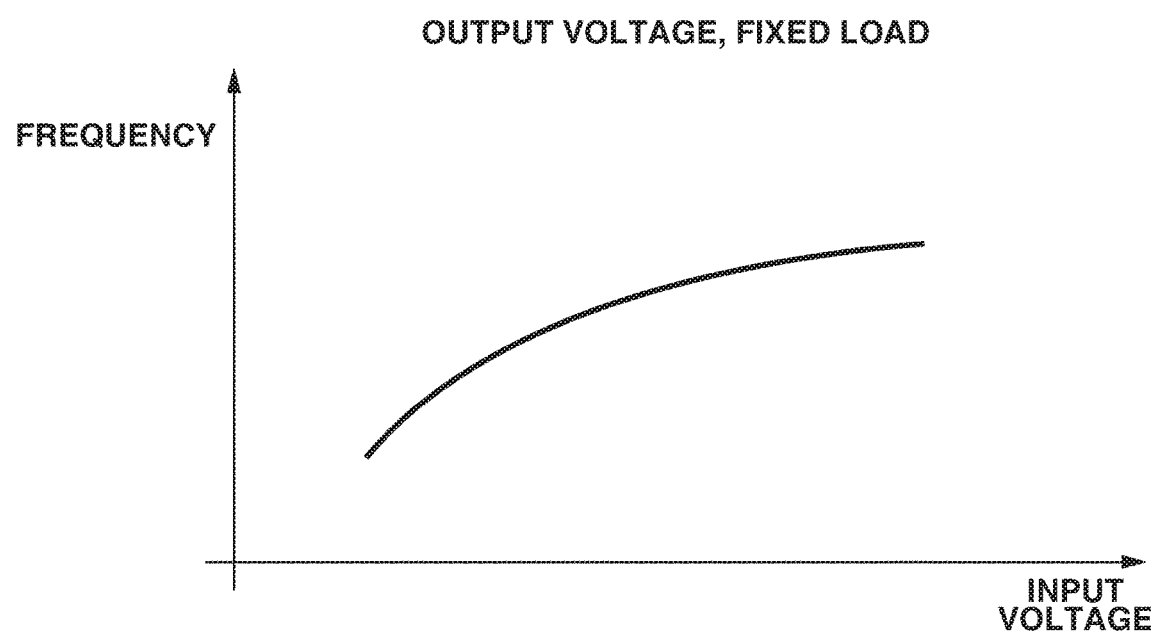
FIG. 6 is a diagram illustrating a relationship between an input voltage and a driving frequency of the converter according to each of the first exemplary embodiment and the second exemplary embodiment.

In a case where the output voltage and the load of the insulating converter 104 are both fixed, a relationship between the driving frequency and the input voltage is expressed in a manner illustrated in FIG. 6. As illustrated in FIG. 6, in a case where an output voltage regulated with respect to a constant load is output, the driving frequency increases as the input voltage increases.

[OVP and Upper Limit Driving Frequency]

The threshold voltage of the OVP circuit 109 is set to satisfy the following conditions 1 and 2.
1. The threshold voltage is a voltage low enough to avoid damaging a component of a load of the insulating converter 104 even if this voltage is applied to the load.
2. The threshold voltage is a voltage higher than a voltage to be input to the OVP circuit 109 during normal operation.

In addition, the upper limit driving frequency is set to satisfy the following conditions 1 and 2.
1. The upper limit driving frequency is a frequency falling within a rated input voltage range of the power supply device 32, and higher than a driving frequency usable at a minimum load that may be present during normal operation.
2. The upper limit driving frequency is a driving frequency that generates an output voltage, which is higher than the threshold of the OVP circuit 109, of the insulating converter 104, in a case where an abnormal input voltage is received by the power supply device 32.

The abnormal input voltage is an input voltage exceeding the rating of the power supply device 32, and is a high voltage that damages a primary-side component of the power supply device 32. For example, the abnormal input voltage is a high input voltage that causes an open vent of the primary smoothing capacitor 101. In other words, it may be said that, the condition 2 for the upper limit driving frequency is to set a voltage, which is lower than a voltage to be input to the OVP circuit 109 if the abnormal input voltage is received by the power supply device 32, as the threshold voltage of the OVP circuit 109. The upper limit driving frequency described here refers to an upper limit driving frequency after activation of an LLC converter. This upper limit driving frequency is different from an upper limit of a driving frequency to be used for soft start at the activation.

Figure 7:
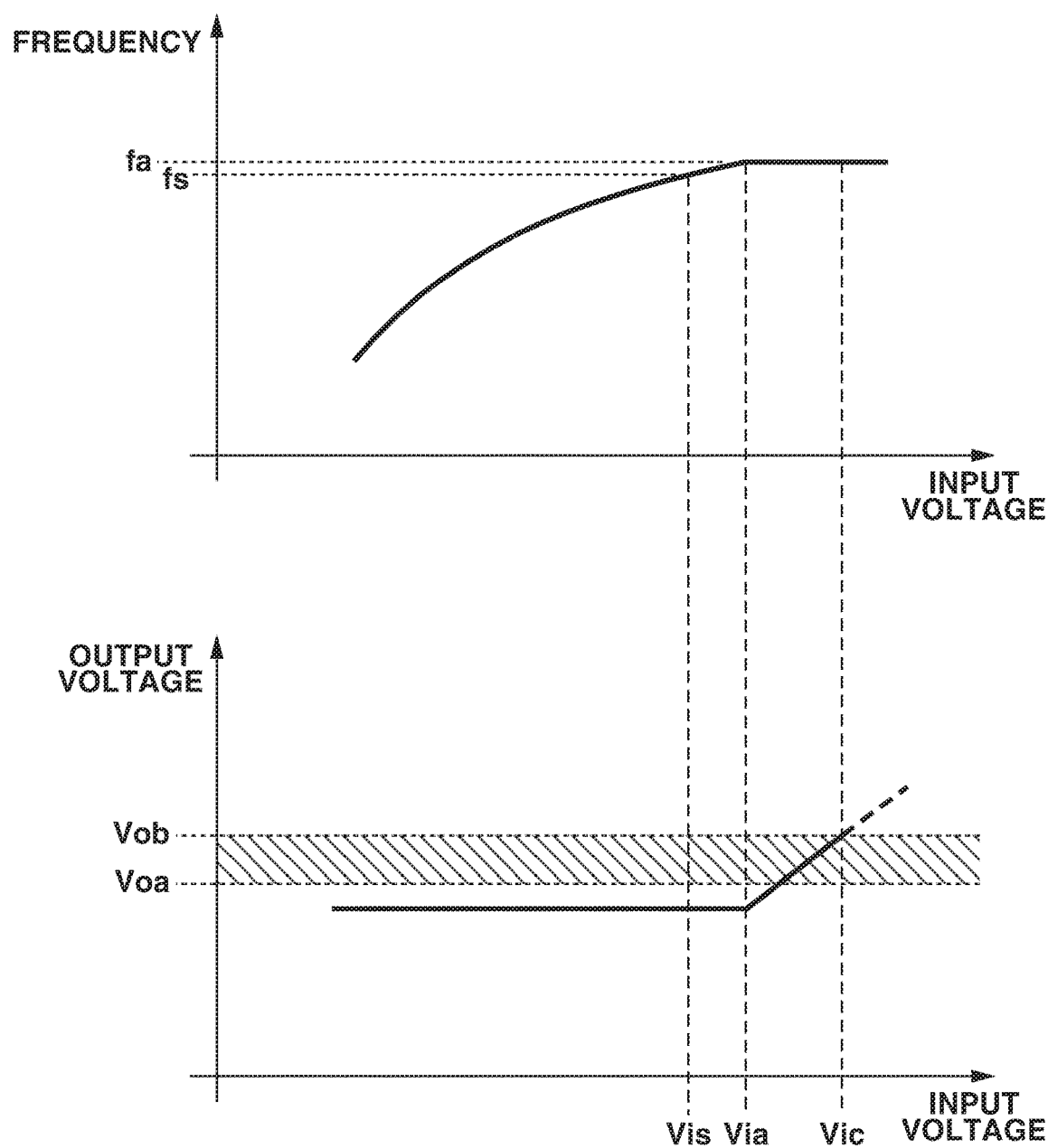
FIG. 7 is a diagram illustrating a relationship between an input voltage and a driving frequency, and a relationship between the input voltage and an output voltage, when the driving frequency of the converter according to each of the first and second exemplary embodiments is limited.

FIG. 7 is a diagram illustrating a transition of each of a driving frequency and an output voltage, with respect to an input voltage. This transition is assumed to occur when, as in FIG. 6, an output voltage and a load are fixed, a load value is a minimum value of a load that may be present during normal operation of the power supply device 32, and an upper limit driving frequency is fa. Each voltage in FIG. 7 is as follows.

Figure 8:
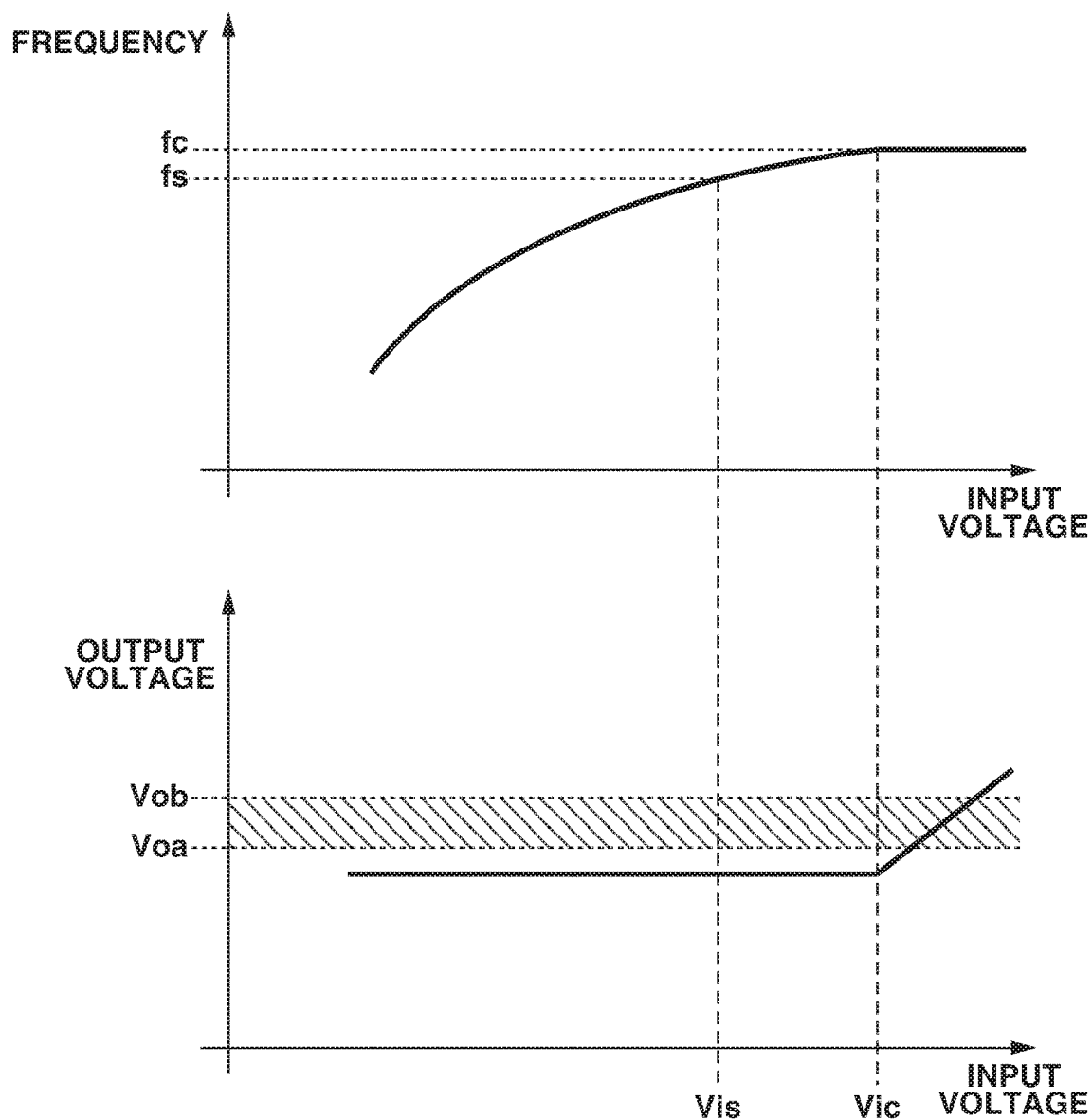
FIG. 8 is a diagram illustrating a relationship between an input voltage and a driving frequency, and a relationship between the input voltage and an output voltage, when the driving frequency of the converter according to each of the first and second exemplary embodiments is limited.

Vob: an upper limit of an OVP threshold determined by the condition 1 for the OVP
Voa: a lower limit of an OVP threshold determined by the condition 2 for the OVP
fs: a lower limit of an upper limit driving frequency settable range determined by the condition 1 for the upper limit driving frequency
fa: an upper limit of an upper limit driving frequency settable range determined by the condition 2 for the upper limit driving frequency
Via: an upper limit of an input voltage regulatable when the upper limit driving frequency is fa
Vic: a voltage that causes an open vent of the primary smoothing capacitor 101
Vis: a maximum value of the rated input voltage When the input voltage increases, the driving frequency increases, and the driving frequency is fs when the input voltage is the maximum Vis of the rated input voltage. When the input voltage is Via, the driving frequency is fa. Since the upper limit driving frequency is fa, the driving frequency continues to be fa even if the input voltage is increased to Via or higher. As apparent from the above-described Equation (1), the gain cannot be decreased if the frequency cannot be increased, and the output voltage increases as the input voltage increases when the driving frequency reaches fa and thereafter. To satisfy the conditions for OVP, the OVP circuit 109 sets a threshold between Voa and Vob. Therefore, the device can be stopped before the input voltage becomes Vic, which is an input voltage (a threshold voltage) that causes an open vent of the primary smoothing capacitor 101. If the threshold voltage of the OVP circuit 109 is Vob, the input voltage at which the OVP circuit 109 operates becomes a value almost equal to Vic. In other words, fa is a maximum value of the upper limit driving frequency that can be set. If a value fc higher than fa is set as the upper limit driving frequency as illustrated in FIG. 8, the output voltage cannot reach the threshold of the OVP circuit 109 even if the input voltage becomes Vic. This leads to an open vent of the primary smoothing capacitor 101.

[Abnormal Input to Power Supply Device]

Figure 4:
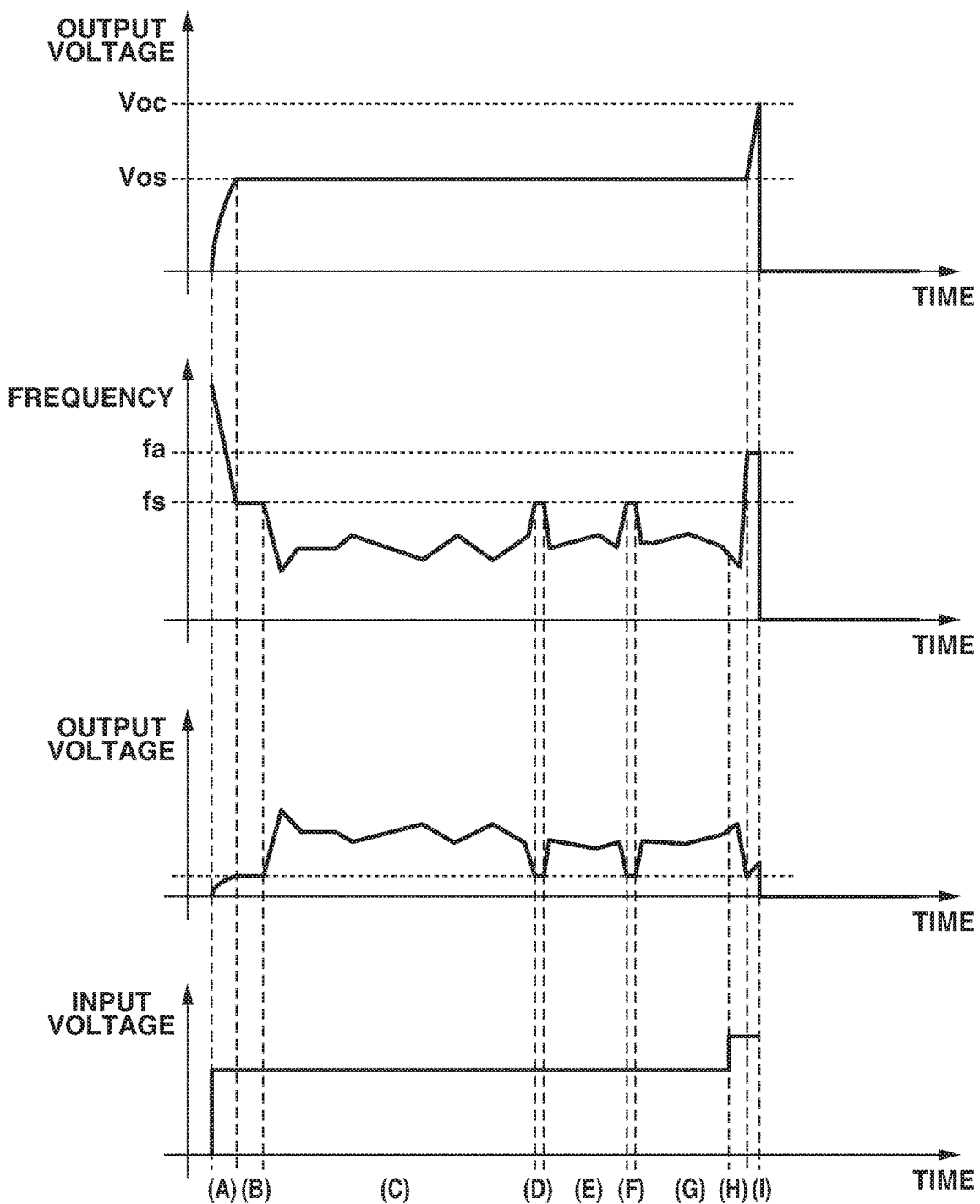
FIG. 4 is a diagram illustrating a temporal transition of an output voltage and a driving frequency of the power supply device according to the first exemplary embodiment.

FIG. 4 illustrates an example of each of a driving frequency change and an output voltage change of the transformer 215 when the power supply device 32 is activated with a maximum input voltage within the rated input voltage range of the power supply device 32. In FIG. 4, a horizontal axis indicates time. Assume that a rated input voltage is input to the power supply device 32 in sections A to G, and an abnormal input voltage is input to the power supply device 32 in sections H and I. The operation of the insulating converter 104 in this case will be described.

When the insulating converter 104 is activated, the LLC control unit 206 performs soft start operation to avoid output overshoot. Specifically, the LLC control unit 206 starts driving the switches 201 and 202 at a high frequency and then gradually decreases the frequency. As the frequency decreases, the output voltage increases to a regulation voltage (the section A). As a load at the time of the activation, only the load 106, which is a minimum load in the normal operation, is connected. Therefore, the driving frequency of the transformer 215 is stable at a frequency fs that is relatively high, and the output voltage is also stable at the regulation voltage (the section B). Afterward, the control unit 33 connects the load 108 by turning on the switch 107, and calibration operation and print operation are thereby performed (the sections C, E, G, and H). During an interval between printing processes, the control unit 33 disconnects the load 108 by turning off the switch 107, and thereby limits the load (the sections D, F, and I). In the section I, the abnormal input voltage is input to the power supply device 32 and therefore, the driving frequency is higher than that in each of the sections B, D, and F even if the loads are the same. At this time, the driving frequency becomes the set upper limit driving frequency. Even with the gain at this moment, the output voltage of the insulating converter 104 cannot be decreased. The output voltage therefore increases and then reaches the threshold of the OVP circuit 109, and the insulating converter 104 thereby stops operating.

As described above, according to the present exemplary embodiment, the load of the insulating converter 104 is restricted, and thereby the driving frequency is restricted to the upper limit. Therefore, in a case where an abnormal input voltage is supplied, the OVP circuit 109 of the power supply device 32 is caused to operate, so that a device failure can be suppressed. In other words, it is possible to provide a device that can address an abnormality of an input voltage, with a low-cost configuration.

[Power Supply Device]

Figure 9:
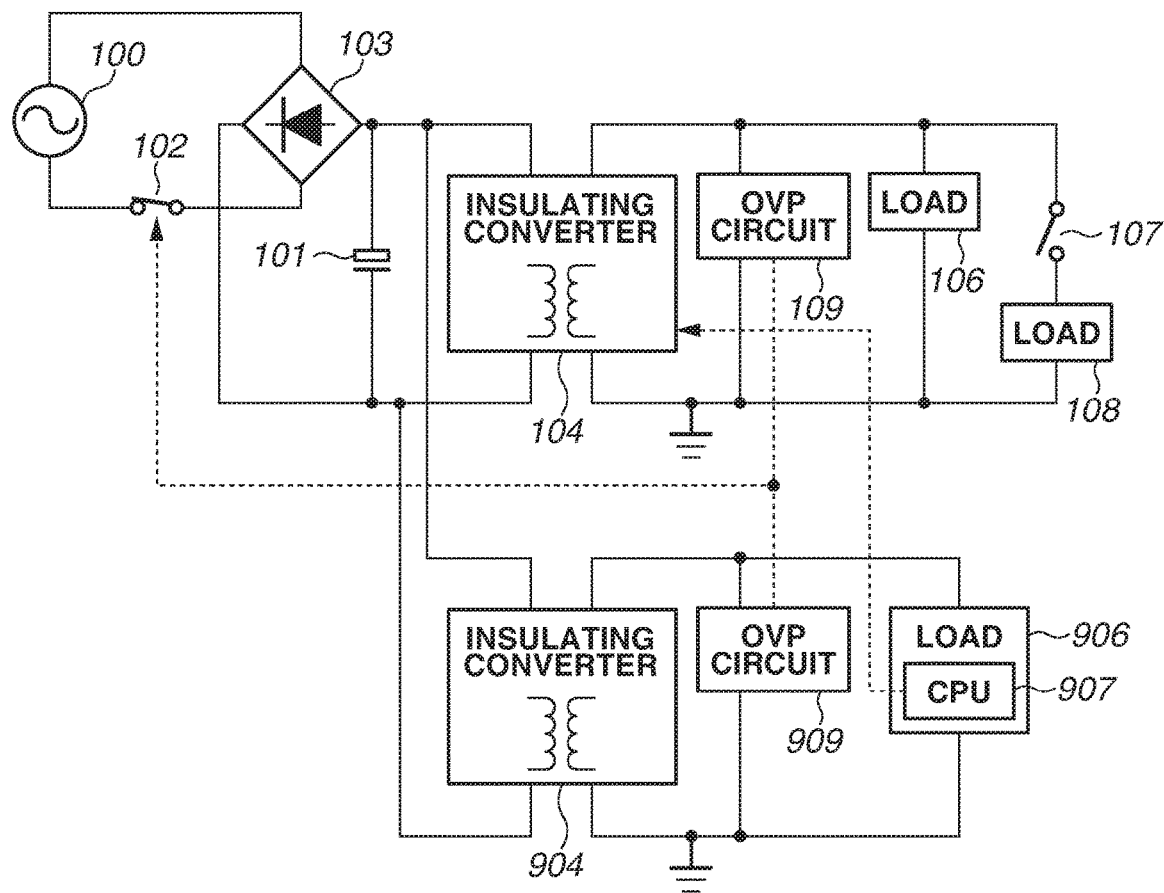
FIG. 9 is a diagram illustrating an overall configuration of a power supply device according to the second exemplary embodiment.

FIG. 9 is a schematic diagram of a power supply device 32 according to a second exemplary embodiment. Components similar to those in FIG. 2 are provided with the same numbers as those in FIG. 2 and will not be described. The insulating converter 104 and an insulating converter 904 are each connected to the primary smoothing capacitor 101 in parallel. The insulating converter 904 is not limited to a converter for frequency control. A load 906 is connected to the insulating converter 904. The load 906 includes a central processing unit (CPU) 907 of the control unit 33. As with the OVP circuit 109, an OVP circuit 909 is a circuit for monitoring an output voltage. In a case where an input to the OVP circuit 909 exceeds a threshold, the OVP circuit 909 stops both of the insulating converters 104 and 904 by turning off the switch 102.

Figure 10:
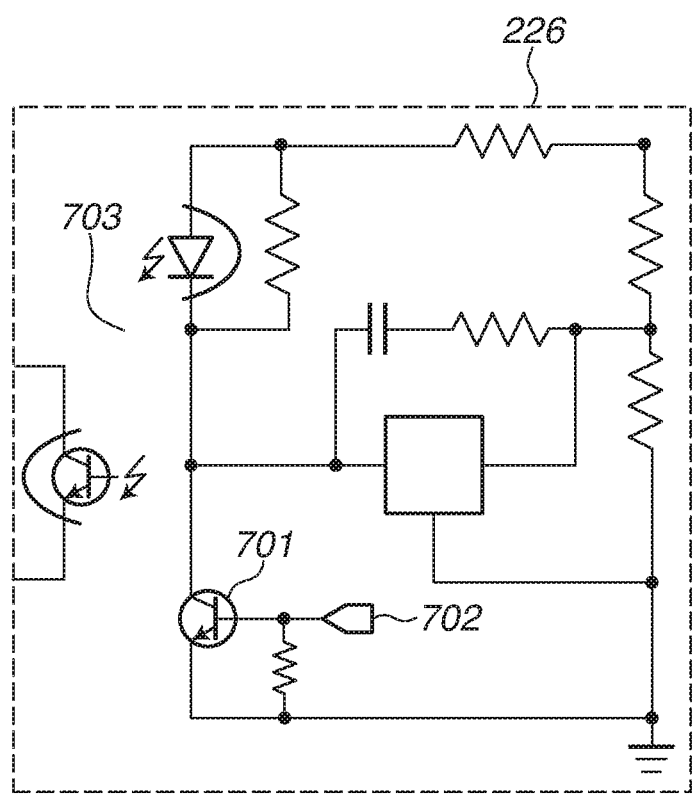
FIG. 10 is a diagram illustrating a feedback circuit according to the second exemplary embodiment.

As illustrated in FIG. 10, a transistor 701 serving as a switch is connected to the feedback circuit 226 of the insulating converter 104 in the present exemplary embodiment. The feedback circuit 226 is a circuit in which a signal from the CPU 907 is input via an input terminal 702, and a photocoupler 703 can be thereby turned off/on, separately from voltage regulation.

[Abnormal Input to Power Supply Device]

Figure 11:
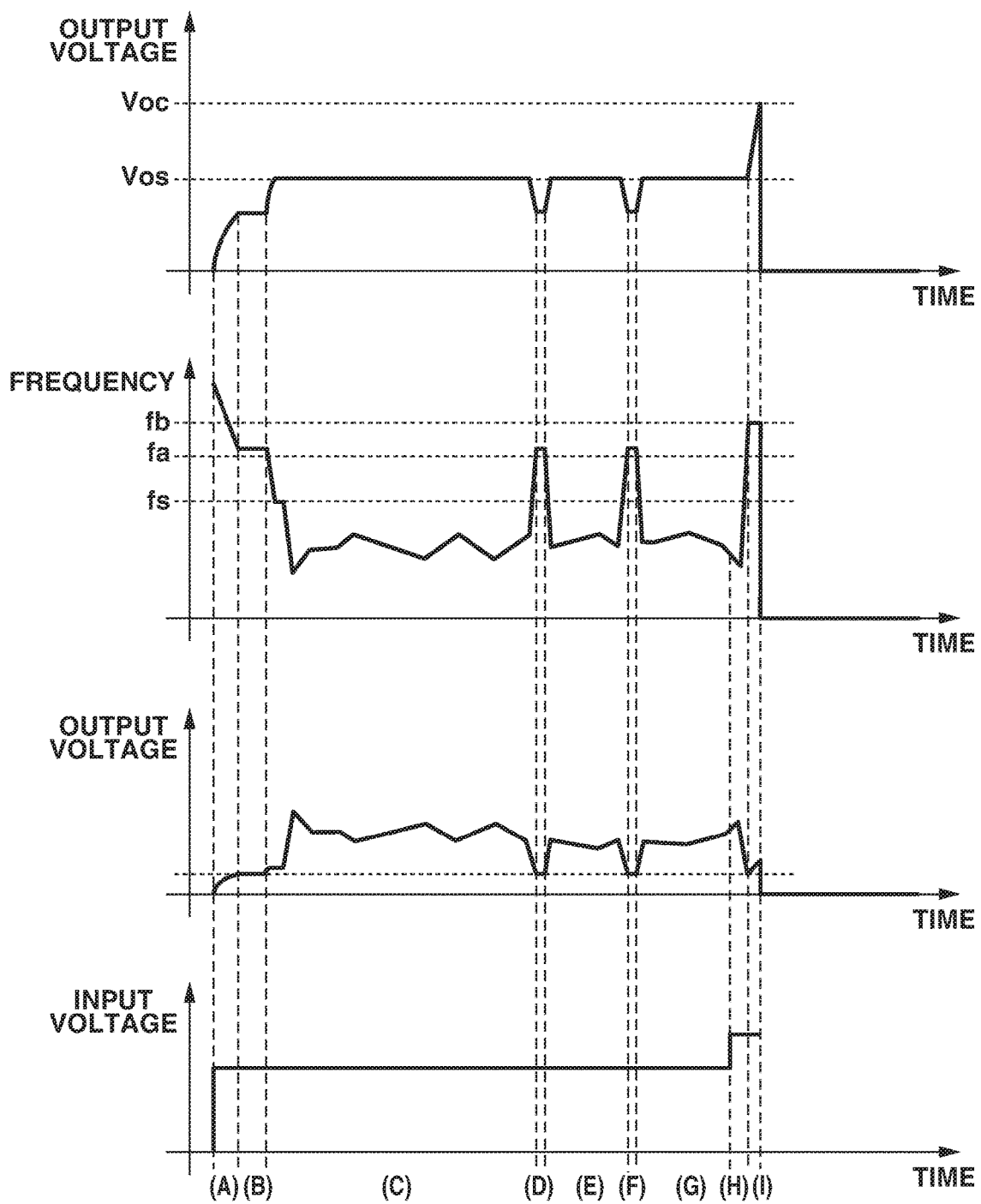
FIG. 11 is a diagram illustrating a temporal transition of an output voltage and a driving frequency of the power supply device according to the second exemplary embodiment.

FIG. 11 illustrates an example of each of a driving frequency change and an output voltage change of the transformer 215, when an input voltage within a rated input voltage range of the power supply device 32 is applied and the input voltage is then increased to an abnormal value. In FIG. 11, a horizontal axis indicates time. Assume that a rated input voltage is input to the power supply device 32 in sections A to G, and an abnormal input voltage is input to the power supply device 32 in sections H and I. Operation of the insulating converter 104 in this case will be described. When the insulating converter 104 is activated, the CPU 907 turns on the transistor 701, and thereby brings the photocoupler 703 into an ON state regardless of the output voltage of the insulating converter 104. The LLC control unit 206 starts driving the switches 201 and 202 at a high frequency and then gradually decreases the frequency to the upper limit driving frequency, and the output voltage increases to a voltage determined by Equation (4) (the section A). Since the photocoupler 703 is in the ON state, the regulation is inactive, and the output voltage corresponds to a gain at the upper limit driving frequency (the section B). Afterward, the CPU 907 enables the regulation by turning off the transistor 701, and connects the load 108 by turning on the switch 107, and thereby calibration operation and print operation are performed (the sections C, E, G, and H). During a period such as an interval between printing processes, the CPU 907 disables the regulation by turning on the transistor 701, and drives the transformer 215 at the upper limit driving frequency (fa or fb) (the sections D, F, and I). In the section I, the abnormal input voltage is input to the power supply device 32 and therefore, the driving frequency is higher than that in each of the sections B, D, and F (becomes fb). At this time, the output voltage increases at a ratio between the input voltage applied in the sections B, D, and F and the input voltage applied in the sections H and I, as clear from Equation (4). The output voltage reaches a threshold Voc of the OVP circuit 109, and thereby the insulating converter 104 stops operating.

As described above, according to the present exemplary embodiment, the load of the insulating converter 104 is restricted, and the driving frequency is restricted to the upper limit. Therefore, in a case where an abnormal input voltage is supplied, the OVP circuit 109 of the power supply device is caused to operate, so that a device failure can be suppressed. In other words, it is possible to provide a device that can address an abnormality of an input voltage, with a low-cost configuration.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-192725, filed Sep. 30, 2016, which is hereby incorporated by reference herein in its entirety.

What is claimed is:

1. A power supply device having a transformer in which a primary side and a secondary side are insulated, thereby converting an input voltage at the primary side, and supplying an output voltage at the secondary side to a load, the power supply device comprising:
   a switching element configured to drive the primary side of the transformer at a driving frequency;
   a control unit configured to control operation of the switching element;

a setting unit configured to set an upper frequency limit of the driving frequency of the switching element;

a capacitor configured to smooth the input voltage and connected to a voltage input side of the transformer;

a switch configured to turn on and off the input voltage at the primary side of the transformer; and an overvoltage detecting unit configured to turn off the switch, in a case where the output voltage of the secondary side exceeds a threshold, in a state that driving is performed using the upper frequency limit set by the setting unit, as the driving frequency of the switching element, wherein, in a case where the input voltage at the primary side is higher than a voltage corresponding to the upper frequency limit, the control unit controls the operation of the switching element to perform driving by using the upper frequency limit as the driving frequency of the switching element without decreasing the output voltage, and wherein the threshold is lower than a voltage that causes an open vent of the capacitor.

2. The power supply device according to claim 1, wherein the upper frequency limit is a frequency higher than a driving frequency when the input voltage is less than a rated voltage.

3. The power supply device according to claim 1, further comprising an another switching element connected in series with the switching element, said another switching element being connected to the primary side of the transformer and configured to drive the primary side of the transformer, wherein the control unit controls the switching element and said another switching element to be alternately turned on and off.

4. The power supply device according to claim 1, wherein the driving frequency increases monotonically up to the upper frequency limit as the input voltage increases.

5. An image forming apparatus comprising:

an image forming unit configured to form an image on a recording material; and a power supply device having a transformer in which a primary side and a secondary side are insulated, thereby converting an input voltage at the primary side, and supplying an output voltage at the secondary side to the image forming unit, wherein the power supply device includes a switching element configured to drive the primary side of the transformer at a driving frequency, a control unit configured to control operation of the switching element, a setting unit configured to set an upper frequency limit of the driving frequency of the switching element, a capacitor configured to smooth the input voltage and connected to a voltage input side of the transformer, a switch configured to turn on and off the input voltage at the primary side of the transformer, and an overvoltage detecting unit configured to turn off the switch, in a case where the output voltage at the secondary side exceeds a threshold, in a state that driving is performed using the upper frequency limit set by the setting unit, as the driving frequency of the switching element, wherein, in a case where the input voltage at the primary side is higher than a voltage corresponding to the upper frequency limit, the control unit controls the operation of the switching element to perform driving by using the upper frequency limit as the driving frequency of the switching element without decreasing the output voltage, and wherein the threshold is lower than a voltage that causes an open vent of the capacitor.

6. The image forming apparatus according to claim 5, wherein the upper frequency limit is a frequency higher than a driving frequency when the input voltage is less than a rated voltage.

7. The image forming apparatus according to claim 5, further comprising a controller configured to control the image forming unit, wherein the power supply device supplies power to the controller.

8. The image forming apparatus according to claim 5, wherein the power supply device further includes an another switching element connected in series with the switching element, said another switching element being connected to the primary side of the transformer and configured to drive the primary side of the transformer, and wherein the control unit controls the switching element and said another switching element to be alternately turned on and off.

9. The image forming apparatus according to claim 5, wherein the driving frequency increases monotonically up to the upper frequency limit as the input voltage increases.

* * * * *